(12) United States Patent
Daou et al.

(10) Patent No.: US 9,284,477 B2
(45) Date of Patent: Mar. 15, 2016

(54) COMPOSITIONS AND METHODS FOR MAINTAINING ZONAL ISOLATION IN A SUBTERRANEAN WELL

(71) Applicant: Schlumberger Technology Corporation, Sugar Land, TX (US)

(72) Inventors: Fatma Daou, Rio de Janeiro (BR); Anthony Loiseau, Rio de Janeiro (BR); Bernardo Engelke, Rio de Janerio (BR)

(73) Assignee: Schlumberger Technology Corporation, Sugar Land, TX (US)

( * ) Notice: Subject to any disclaimer, the term of this patent is extended or adjusted under 35 U.S.C. 154(b) by 80 days.

(21) Appl. No.: 14/108,326

(22) Filed: Dec. 16, 2013

(65) Prior Publication Data
US 2015/0166874 A1    Jun. 18, 2015

(51) Int. Cl.
*C04B 16/04* (2006.01)
*C09K 8/467* (2006.01)
*E21B 33/13* (2006.01)

(52) U.S. Cl.
CPC ............. *C09K 8/467* (2013.01); *E21B 33/13* (2013.01)

(58) Field of Classification Search
CPC ... C04B 16/04; C04B 16/0616; C04B 16/0625; C04B 16/0633; C04B 16/0658
See application file for complete search history.

(56) References Cited

U.S. PATENT DOCUMENTS

| | | | | |
|---|---|---|---|---|
| 6,645,288 | B1 * | 11/2003 | Dargaud | C04B 16/04 |
| | | | | 106/696 |
| 6,902,001 | B2 * | 6/2005 | Dargaud | C04B 28/02 |
| | | | | 166/293 |
| 6,907,929 | B2 * | 6/2005 | Leroy-Delage | C04B 18/22 |
| | | | | 106/696 |
| 7,402,204 | B2 * | 7/2008 | Le Roy-Delage | C04B 16/04 |
| | | | | 106/719 |
| 7,470,322 | B2 * | 12/2008 | Drochon | C04B 20/0076 |
| | | | | 106/713 |
| 2010/0137473 | A1 | 6/2010 | Carelli et al. | |
| 2010/0258310 | A1 | 10/2010 | James et al. | |
| 2010/0270016 | A1 | 10/2010 | Carelli et al. | |
| 2010/0307750 | A1 | 12/2010 | Drochon et al. | |
| 2012/0145392 | A1 | 6/2012 | James | |
| 2012/0205105 | A1 | 8/2012 | Le Roy-Delage et al. | |
| 2012/0205106 | A1 * | 8/2012 | Le Roy-Delage | C04B 28/02 |
| | | | | 166/293 |
| 2013/0146286 | A1 * | 6/2013 | Le Roy-Delage | C04B 18/20 |
| | | | | 166/292 |
| 2014/0060836 | A1 | 3/2014 | Daou et al. | |

FOREIGN PATENT DOCUMENTS

| | | |
|---|---|---|
| EP | 2071003 | 6/2009 |
| EP | 2128215 | 12/2009 |
| EP | 2192094 | 6/2010 |
| WO | 00/20350 | 4/2000 |
| WO | 00/37387 | 6/2000 |
| WO | 01/25163 | 4/2001 |
| WO | 2006/061561 | 6/2006 |
| WO | 2009/074658 | 6/2009 |
| WO | 2010/115523 | 10/2010 |
| WO | 2010/124769 | 11/2010 |

OTHER PUBLICATIONS

"The use of styrene-butadiene rubber waste as a potential filler in nitrile rubber: order of addition and size of waste particles", Baeta et al., Brazilian Journal of Chemical Engineering (On line version ISSN 0104-6632), vol. 26, No. 1, Sao Paulo Jan./Mar. 2009, pp. 1-11.*
H. Bouras et al., "Responsive Cementing Material Prevents Annular Leaks in Gas Wells," paper SPE 116757 (2008).
P. Cavanagh, et al., "Self-Healing Cement—Novel Technology to Achieve Leak-Free Wells," paper SPE 105781 (2007).
C.M. Dry, "Three designs for the internal release of sealants, adhesives and waterproofing chemicals into concrete to reduce permeability." Cement and Concrete Research 30 (2000) 1969-1977.
S. Jagels, "Types of Fluorinated Elastomers," SW Jagels Materials and Technology LLC (2009).
E. Lecolier, et al., "Durability of Oilwell Cement Formulations Aged in H2S-Containing Fluids," paper IADC/SPE 99105, presented at the IADC/SPE Drilling Conference, Miami, Florida USA, Feb. 21-23, 2006.
S. Le Roy-Delage, et al., "Self-Healing Cement System—A Step Forward in Reducing Long-Term Environmental Impact," paper SPE 128226 (2010).
T. Pervez, et al., "Effects of Exposure on Material Response of a Swelling Elastomer," Archives of Materials Science and Engineering, vol. 37, No. 2 (Jun. 2009) 77-84.
J. Roth, et al., "Innovative Hydraulic Isolation Material Preserves Well Integrity," paper SPE 112715 (2008).
International search report and written opinion for the equivalent PCT patent application No. PCT/US2014/069880 issued on Mar. 10, 2015.

* cited by examiner

*Primary Examiner* — Paul Marcantoni

(57) ABSTRACT

Well cementing compositions comprise water, an inorganic cement and flexible particles having an average density higher than 1.5 g/cm³. The flexible particles may be elastomers. The flexible particles and cement particles may be present in a trimodal particle size distribution. The compositions may be placed in subterranean wells in the context of primary or remedial cementing.

20 Claims, No Drawings

COMPOSITIONS AND METHODS FOR MAINTAINING ZONAL ISOLATION IN A SUBTERRANEAN WELL

BACKGROUND

The statements in this section merely provide background information related to the present disclosure and may not constitute prior art.

This disclosure relates to compositions and methods for treating subterranean formations, in particular, compositions and methods for cementing and completing wells which may be subjected to extreme dynamic stresses or into which aggressive fluids such as carbon dioxide or hydrogen sulfide are injected, stored or extracted.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone.

The cement sheath achieves hydraulic isolation because of its low permeability. In addition, intimate bonding between the cement sheath and both the tubular body and borehole is necessary to prevent leaks. However, over time the cement sheath can deteriorate and become permeable. Alternatively, the bonding between the cement sheath and the tubular body or borehole may become compromised. The principal causes of deterioration and debonding include physical stresses associated with well operations, tectonic movements, temperature changes and chemical deterioration of the cement.

The pressure inside well casing may increase or decrease as the fluids change or as additional pressure is applied to the well, such as when drilling fluid is being replaced by a completion fluid or during a stimulation operation. The cement may also be subjected to stresses which are dynamic in nature either because they occur over a very short time period or because they are repetitive. For example, perforating does not just cause an over-pressure of a few hundred bars inside the well that dissipates in the form of a shock wave. In addition, perforating creates a shock when the projectile penetrates the cement and the shock subjects the zone surrounding the wellbore to large forces extending of a length of a few meters.

Casing expansion arising from large temperature increases experienced during thermal recovery processes such as cyclic steam stimulation (CSS) or steam assisted gravity drainage (SAGD) may impart large stresses to the cement sheath.

Another process that creates dynamic stresses in the cement is the cutting of cemented casing to create a sidetrack. Milling the steel over a depth of a few meters followed by drilling the sidetrack subjects the cement to shock and vibration that may cause irreversible damage.

Persons skilled in the art recognize that the risk of cement-sheath rupture depends on the thermoelastic properties of the casing, the cement, and the formation that surrounds the well. A detailed analysis of the mechanisms leading to rupture of the cement sheath has shown that the risk of rupture of a cement sheath following an increase in pressure and/or temperature in the well is directly linked to the tensile strength of the cement and is attenuated when the ratio of the tensile strength $R_T$ of the cement over its Young's modulus E is increased.

One aim of the present disclosure is to provide well cements that are reinforced with elastomers. The elastomer particles improve the flexibility of the set cement and the ability of the cement sheath to withstand physical stresses such as those described above.

Cements containing elastomers may also be applicable to wells into which carbon dioxide is injected (e.g. during Enhanced Oil Recovery technique), in which carbon dioxide is stored or from which carbon dioxide is recovered. In addition, there are some oil and gas wells whose reservoirs naturally contain carbon dioxide.

A relatively new category of wells involving carbon dioxide is associated with carbon-sequestration projects. Carbon sequestration is a geo-engineering technique for the long-term storage of carbon dioxide or other forms of carbon, for various purposes such as the mitigation of "global warming." Carbon dioxide may be captured as a pure byproduct in processes related to petroleum refining or from the flue gases from power plants that employ fossil fuels. The gas is then usually injected into subsurface saline aquifers or depleted oil and gas reservoirs. One of the challenges is to trap the carbon dioxide and prevent leakage back to the surface; maintaining a competent and impermeable cement sheath is a critical requirement. Certain elastomers swell in the presence of carbon dioxide and, should the cement sheath suffer damage in the form of cracks, fissures or the like, the elastomer particles may swell and seal off the damage. Such cement systems are known in the art as "self-healing cements." Similarly, there are elastomers known in the art that swell in the presence of hydrocarbons and hydrogen sulfide.

Elastomers known in the art for creating flexible or self-healing cements tend to have low densities; consequently, the slurry-density range of the cements may be limited to about 1920 kg/m$^3$ (16.0 lbm/galUS). Weighting materials such as hematite, ilmenite, barite and manganese tetraoxide may be added to increase the slurry density. With elastomers heretofore used in the art, the maximum slurry density attainable for flexible or self-healing cements containing weighting materials may be about 2280 kg/m$^3$ (19.0 lbm/galUS).

SUMMARY

The present disclosure presents improvements by describing compositions that form sustainable cement sheaths in terms of mechanical shock resistance, self-healing ability or both. The compositions comprise elastomeric particles that may allow the preparation of resistant cement systems at higher slurry densities.

In an aspect, embodiments relate to well cementing compositions. The compositions comprise water, inorganic cement particles and flexible particles that have an average density higher then 1.5 g/cm$^3$.

In a further aspect, embodiments relate to methods for cementing a subterranean well. A composition is prepared that comprises water, inorganic cement particles and flexible particles that have an average density higher then 1.5 g/cm$^3$. The composition is then placed in the well.

In yet a further aspect, embodiments relate to methods for treating a subterranean well. A composition is prepared that comprises water, inorganic cement particles and flexible particles that have an average density higher then 1.5 g/cm³. The composition is then placed in the well.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the Applicant appreciate and understands that any and all data points within the range are to be considered to have been specified, and that the Applicant possessed knowledge of the entire range and all points within the range.

As stated earlier, cement systems that form a flexible, durable or self-healing cement sheath at higher slurry densities would be positively received by the industry. Applicants have determined that elastomer particles that have specific gravities exceeding about 1.5 g/cm³ may provide the protective properties when incorporated into cement systems.

In an aspect, embodiments relate to well cementing compositions. The compositions comprise water, inorganic cement particles and flexible particles that have an average density higher then 1.5 g/cm³.

In a further aspect, embodiments relate to methods for cementing a subterranean well. A composition is prepared that comprises water, inorganic cement particles and flexible particles that have an average density higher then 1.5 g/cm³. The composition is then placed in the well.

In yet a further aspect, embodiments relate to methods for treating a subterranean well. A composition is prepared that comprises water, inorganic cement particles and flexible particles that have an average density higher then 1.5 g/cm³. The composition is then placed in the well.

For all aspects, the flexible particles may comprise fluoroelastomers, perfluoroelastomers, copolymers of tetrafluoroethylene and propylene, fluorosilicones or polytetrafluoroethylenes or combinations thereof. Further information concerning these materials is presented in Table 1.

TABLE 1

Elastomers whose specific-gravity ranges are higher than or equal 1.50

| CODE | Elastomer | Specific Gravity | Maximum Temperature (° C.) | Commercial Names |
|---|---|---|---|---|
| FKM | fluoroelastomer | 1.80-1.93 | 200 | Tecnoflon ™ (Solvay); V3206-75B, V3358-75B, V1238-95 (Parker) |
| FFKM | perfluoroelastomer | 1.92 | 230 | Chemraz ™ (Greene Tweed) |
| TFE/P | copolymer of tetrafluoroethylene and propylene | 1.57 | 220 | V1041-85 (Parker) |
| FVMQ | fluorosilicone | 1.46-1.54 | 175 | 7813A, 7813B (Dow Corning); L3355-70B (Parker) |
| PTFE | polytetrafluoroethylene | 2.18 | 233 | TF0200 (Parker) |

For all aspects, the composition may further comprise flexible particles comprising ethylene-vinyl acetate rubbers, silicones, hydrogenated nitrile rubbers, polyacrylics, chloroprenes, styrene-butadienes, styrene-butadiene-styrenes, styrene divinylbenzenes, styrene-ethylene-butylene-styrenes, ethylene acrylics or nitrile rubbers or combinations thereof, wherein the flexible particles are present in a mixture that has an average density higher than 1.5 g/cm³. Further information concerning these materials is presented in Table 2.

TABLE 2

Elastomers that may be used in concert with high-specific-gravity elastomers, provided average particle density is higher than or equal to 1.5.

| CODE | Elastomer | Specific Gravity | Maximum Temperature (° C.) | Commercial Names |
|---|---|---|---|---|
| VMQ | silicone | 1.35 | 205 | S0604-70 (Parker) |
| FVMQ | fluorosilicone | 1.46-1.54 | 175 | 7813A, 7813B (Dow Corning); L3355-70B (Parker) |
| EVM | ethylene-vinyl acetate rubber | 1.11 | — | Levapren ™ (LANXESS) |

TABLE 2-continued

Elastomers that may be used in concert with high-specific-gravity elastomers, provided average particle density is higher than or equal to 1.5.

| CODE | Elastomer | Specific Gravity | Maximum Temperature (° C.) | Commercial Names |
|---|---|---|---|---|
| HNBR | hydrogenated nitrile rubber | 1.19-1.31 | 140 | N3362-70B, KB163-90 (Parker); 3404, 3407, 3467 (LANXESS) |
| SBR | styrene-butadiene | 1.21 | 90 | G3244-70B (Parker) |
| ACM | polyacrylic | 1.31 | 150 | A3208-70-B (Parker) |
| EPDM | ethylene-propylene | 1.12 | 150 | E3207-70B (Parker) |
| CR | chloroprene | 1.43 | 100 | C0873-70 (Parker) |
| EAM | ethylene acrylic | 1 22 | 150 | D3389-60B (Parker) |
| NBR | nitrile rubber | 1.00-1.23 | 100 | N3275-70B, n0674-70 (Parker); Baymod ™ (LANXESS) |

For all aspects, the particle-size distribution of the material may be such that the average particle size is between about 10 µm and about 1000 µm. The average particle size may also be between about 100 µm and 900 µm.

For all aspects, the flexible particles may be present in the cement slurry at a concentration between 1% and 55% by volume.

For all aspects, the composition may further comprise charcoal, petcoke, graphite fluid coke, delayed coke, calcined coke, asphalt, anthracite, flake coke, amorphous pitch coke, metallurgical coke, lignite, amorphous graphite, anode coke, bituminous coal, sub-bituminous coal, exinite, vitrinite, internitite, unitaite, needle coke or activated coke or combinations thereof.

For all aspects, the cement particles and flexible particles may be present in at least a trimodal particle size distribution. A trimodal particle-size distribution of the particulate materials allows the composition to have a higher solid-volume fraction, yet retain optimal rheological properties and stability. In addition, after curing, the cement may be less permeable and develop higher compressive strength. The solid volume fraction is the ratio between the volume of solids in a slurry and the total slurry volume. The solid volume fraction can be maximized by using coarse, medium and fine particles in specific volumetric ratios. The fine particles fit in the void spaces between the medium-size particles, and the medium-size particles fit in the void spaces between the coarse particles. For two consecutive granulometric classes, the order of magnitude between the mean particle diameter ($d_{50}$) of each class should ideally be between 7 and 10.

For all aspects, the composition may have a density higher than or equal to 2280 kg/m³ (19.0 lbm/galUS).

For all aspects of the invention the inorganic cement may comprise Portland cement, calcium aluminate cement, fly ash, blast furnace slag, lime-silica blends, zeolites, geopolymers, Sorel cements or chemically bonded phosphate ceramics, or mixtures thereof. The composition shall be pumpable. Those skilled in the art will recognize that a pumpable fluid in the context of well cementing has a viscosity lower than about 1000 mPa-s at a shear rate of 100 s$^{-1}$ at the temperatures to which the fluid is exposed during a cementing operation, and during the time necessary to place the composition in the well.

The cement slurry may further comprise dispersing agents, fluid-loss-control agents, set retarders, set accelerators, foaming agents, gas generating agents, antifoaming agents, extenders, weighting agents, lost-circulation control agents and combinations thereof.

Persons skilled in the art will recognize that these methods may be performed during a primary cementing operation or a remedial cementing operation. The primary cementing operation may be performed the traditional way (i.e., the slurry is pumped down the casing and up the annulus) or by "reverse cementing," which consists of pumping the slurry down the annulus.

EXAMPLES

The following examples serve to further illustrate the disclosure. Tests were performed according to recommended practices published by the American Petroleum Institute (API Publication RP10B) and the International Organization for Standards (ISO Publication 10426-2).

Example 1

A series of 12 cement slurries was prepared. Slurries A, D, G and J contained a conventional elastomer, acrylonitrile-butadiene copolymer (ABC), which has a specific gravity of 1.04. Slurries B, E, H and K contained an elastomer disclosed by Applicant, fluoroelastomer (FKM), which has a specific gravity of 1.93. Slurries C, F, I and L contained another elastomer disclosed by Applicant, polytetrafluoroethylene (PTFE), which has a specific gravity of 2.18. Slurries G, H, I, J, K and L also contained a weighting agent, hematite.

For two similar formulations (equal SVFs and elastomer concentrations), using FKM or PTFE allowed the preparation of slurries with significantly higher densities. For example, the density of Slurry C was 340 kg/m³ higher than Slurry A. The density of Slurry F was 380 kg/m³ higher than Slurry D.

Slurry B, which had an SVF that was 5% lower than Slurry D, still had the higher density. Similarly, the density of Slurry C was 300 kg/m³ higher than Slurry D.

When the weighting agent was added, it was possible to prepare cement slurries with densities up to 2450 kg/m³ with the heavier elastomers. The maximum attainable density using the conventional ABC particles was 2280 kg/m³.

TABLE 3

Cement slurry densities attained by addition of various elastomer particles.

| Material | SG | A<br>% BVOB† | B<br>% BVOB | C<br>% BVOB | D<br>% BVOB | E<br>% BVOB | F<br>% BVOB |
|---|---|---|---|---|---|---|---|
| Class G cement | 3.2 | 31.5 | 31.5 | 31.5 | 31.5 | 31.5 | 31.5 |
| Silica | 2.65 | 13.5 | 13.5 | 13.5 | 13.5 | 13.5 | 13.5 |
| ABC* | 1.04 | 55 | | | 55 | | |
| FKM | 1.93 | | 55 | | | 55 | |
| PTFE | 2.18 | | | 55 | | | |
| Hematite | 4.95 | | | | | | |
| SVF** | | 55 | 55 | 55 | 60 | 60 | 60 |
| Fluid Density (kg/m³) | | 1520 | 1790 | 1860 | 1560 | 1860 | 1940 |

| Material | SG | G<br>% BVOB | H<br>% BVOB | I<br>% BVOB | J<br>% BVOB | K<br>% BVOB | L<br>% BVOB |
|---|---|---|---|---|---|---|---|
| Class G cement | 3.2 | 31.5 | 31.5 | 31.5 | 31.5 | 31.5 | 31.5 |
| Silica | 2.65 | 13.5 | 13.5 | 13.5 | 13.5 | 13.5 | 13.5 |
| ABC* | 1.04 | | 24.5 | | 24.5 | | |
| FKM | 1.93 | | 24.5 | | | 24.5 | |
| PTFE | 2.18 | | | 55 | 24.5 | | 24.5 |
| Hematite | 4.95 | 30.5 | 30.5 | 30.5 | 30.5 | 30.5 | 30.5 |
| SVF** | | 55 | 55 | 55 | 60 | 60 | 60 |
| Fluid Density (kg/m³) | | 2170 | 2290 | 2330 | 2280 | 2410 | 2450 |

†by volume of blend;
*acrylonitrile-butadiene copolymer;
**solid volume fraction Example 2

Three slurries were prepared that contained FKM fluoroelastomer, described in Table 1. All of the cement slurries described below contained a polysaccharide biopolymer anti-settling agent, sodium polynaphthalene sulfonate dispersant, an antifoam agent composed of siloxanes and silicones, calcium lignosulfonate retarder, and crosslinked polyvinylalcohol/polyvinylpyrrolidone (PVA/PVP) for control of annular fluid migration. The rheological properties, free fluids, thickening times, strengths and fluid-loss values are presented in Table 4. The bob/rotor/spring combination employed during the rheological measurements was R1/B1/F1.

TABLE 4

Performance of Slurries Containing FKM Elastomer.

| System ID# | System #1 | System #2 | System #3 |
|---|---|---|---|
| FKM (% BVOB*) | 8.5 | 12 | 17 |
| Solid Volume Fraction (SVF), % | 58 | 58 | 58 |
| Density, kg/m³ (lbm/galUS) | 1920 (16) | 1920 (16) | 1920 (16) |
| Mix fluid design | | | |
| Water | Fresh | Fresh | Fresh |
| Antisettling, % BWOB | 0.3 | 0.15 | 0.15 |
| Antifoam, L/tonne blend | 4.45 | 4.45 | 4.45 |
| Dispersant, L/tonne blend | 3.56 | 1.78 | 1.78 |
| Retarder, L/tonne blend | 0.02 | 1.78 | 1.78 |
| PVA/PVP, L/tonne blend | 40.1 | 40.1 | 40.1 |
| Rheological Properties after Conditioning @ 27° C. (80° F.) Bingham Model | | | |
| PV (cP) | 221.9 | 208.0 | 250.6 |
| Ty, Pa (lbf/100 ft²) | 10.5 (21.9) | 11.1 (23.2) | 13.5 (28.1) |

TABLE 4-continued

Performance of Slurries Containing FKM Elastomer.

| System ID# | System #1 | System #2 | System #3 |
|---|---|---|---|
| Gel Strength, kPa (10 sec, 10 min) | 5.7  12.9 | 12.9  25.4 | 15.3  28.2 |
| Rheological Properties after Conditioning @ 46° C. (115° F.) Bingham Model | | | |
| PV (cP) | 170.0 | 144.7 | 154.5 |
| Ty, Pa (lbf/100 ft²) | 10.8 (22.7) | 8.1 (17.0) | 9.4 (19.7) |
| Gel Strength, kPa (10 sec, 10 min) | 5.7  12.9 | 8.1  19.2 | 9.1  18.2 |
| Free Fluid, mL (after 2 hours) | 0 | 0 | 0 |
| Thickening Time (h:m:s) | 08:38:30 | 6:00:00 | 05:48:00 |
| 24-hr strength, MPa | 14.0 | — | — |
| API Fluid Loss (mL) | 14 | 16 | 22 |

*BWOB = by weight of solid blend

Slurry stability tests were performed on the three systems at 75° C. (167° F.). In all cases, the specific gravity difference between the top and bottom of the column was less than 0.03, indicating that, despite the use of heavier elastomers, essentially no slurry sedimentation occurred.

Example 3

A slurry was prepared that contained ACM polyacrylic elastomer, described in Table 1. The slurry contained a polysaccharide biopolymer anti-settling agent, sodium polynaphthalene sulfonate dispersant, an antifoam agent composed of siloxanes and silicones, calcium lignosulfonate retarder, and crosslinked polyvinylalcohol/polyvinylpyrrolidone (PVA/PVP) for control of annular fluid migration. The rheological properties and free fluids are presented in Table 5.

The bob/rotor/spring combination employed during the rheological measurements was R1/B1/F1.

TABLE 5

Performance of Slurries Containing ACM Elastomer.

| System#ID | System#4 |
|---|---|
| ACM (% BVOB) | 7.3 |
| Solid Volume Fraction (SVF), % | 58 |
| Density, kg/m³ (lbm/galUS) | 1920 (16) |
| Mix fluid design | |
| Water, g | Fresh |
| Antisettling, % BWOB | 0.3 |
| Antifoam, L/tonne blend | 4.45 |
| Dispersant, L/tonne blend | 3.56 |
| Retarder, L/tonne blend | 1.78 |
| PVA/PVP, L/tonne blend | 40.1 |
| Rheological Properties after Conditioning @ 27° C. (80° F.} Bingham Model | |
| PV (cP) | 269 |
| Ty, Pa (lbf/100 ft²) | 6.65 (13.9) |
| Gel Strength, kPa (10 sec, 10 min) | 4.3, 9.1 |
| Free Fluid, mL (After 2 hours) | 0 |

Example 4

Systems 1 and 4 from Tables 3 and 4, respectively, were evaluated in terms of their mechanical properties. Unconfined set cement samples were placed in a hydraulic press, and compressive strength, Young's modulus and Poisson's ratio were measured. The results are presented in Table 5.

TABLE 6

Mechanical Properties of Set Cements Containing Elastomers

| System | Peak Effective Compressive Strength | | Young's Modulus | | Poisson's Ratio |
|---|---|---|---|---|---|
| | (psi) | (MPa) | (psi) | (MPa) | |
| 1 | 2611 | 18.00 | 875.500 | 6036 | 0.13 |
| 4 | 3330 | 22.96 | 1,243,000 | 8570 | 0.18 |

Although various embodiments have been described with respect to enabling disclosures, it is to be understood that the preceding information is not limited to the disclosed embodiments. Variations and modifications that would occur to one of skill in the art upon reading the specification are also within the scope of the disclosure, which is defined in the appended claims.

The invention claimed is:

1. A well cementing composition, comprising:
 (i) water;
 (ii) inorganic cement particles; and
 (iii) flexible particles having an average density higher than 1.5 g/cm³.

2. The composition of claim 1, wherein the flexible particles comprise fluoroelastomers, perfluoroelastomers, copolymers of tetrafluoroethylene and propylene, fluorosilicones, or polytetrafluoroethylenes, or combinations thereof.

3. The composition of claim 1, further comprising flexible particles comprising ethylene-vinyl acetate rubbers, silicones, hydrogenated nitrile rubbers, polyacrylics, chloroprenes, styrene-butadienes, styrene-butadiene-styrenes, styrene divinylbenzenes, styrene-ethylene-butylene-styrenes, ethylene acrylics or nitrile rubbers or combinations thereof, wherein the flexible particles are present in a mixture that has an average density higher than 1.5 g/cm³.

4. The composition of claim 1, wherein the flexible particles have a particle size between 10 μm and 1000 μm.

5. The composition of claim 1, wherein the flexible particles are present at a concentration between 1% and 55% by volume.

6. The composition of claim 1, further comprising charcoal, petcoke, graphite fluid coke, delayed coke, calcined coke, asphalt, anthracite, flake coke, amorphous pitch coke, metallurgical coke, lignite, amorphous graphite, anode coke, bituminous coal, sub-bituminous coal, exinite, vitrinite, internitite, unitaite, needle coke or activated coke or combinations thereof.

7. The composition of claim 1, wherein the cement particles and flexible particles are present in at least a trimodal particle size distribution.

8. The composition of claim 1, wherein the composition has a density higher than or equal to 2280 kg/m³.

9. A method for cementing a subterranean well, comprising:
 (i) preparing a composition comprising water, inorganic cement particles and flexible particles having an average density higher than 1.5 g/cm³;
 (ii) placing the composition into the well.

10. The method of claim 9, wherein the flexible particles comprise fluoroelastomers, perfluoroelastomers, copolymers of tetrafluoroethylene and propylene, fluorosilicones, or polytetrafluoroethylenes, or combinations thereof.

11. The method of claim 9, further comprising flexible particles comprising ethylene-vinyl acetate rubbers, silicones, hydrogenated nitrile rubbers, polyacrylics, chloroprenes, styrene-butadienes, styrene-butadiene-styrenes, styrene divinylbenzenes, styrene-ethylene-butylene-styrenes, ethylene acrylics or nitrile rubbers or combinations thereof, wherein the flexible particles are present in a mixture that has an average density higher than 1.5 g/cm³.

12. The method of claim 9, wherein the flexible particles have a particle size between 10 μm and 1000 μm.

13. The method of claim 9, wherein the flexible particles are present at a concentration between 1% and 55% by volume.

14. The method of claim 9, further comprising charcoal, petcoke, graphite fluid coke, delayed coke, calcined coke, asphalt, anthracite, flake coke, amorphous pitch coke, metallurgical coke, lignite, amorphous graphite, anode coke, bituminous coal, sub-bituminous coal, exinite, vitrinite, internitite, unitaite, needle coke or activated coke or combinations thereof.

15. The method of claim 9, wherein the cement particles and flexible particles are present in at least a trimodal particle size distribution.

16. The method of claim 9, wherein the composition has a density higher than or equal to 2280 kg/m³.

17. A method for treating a subterranean well, comprising
 (i) preparing a composition comprising water, inorganic cement particles and flexible particles having an average density higher than 1.5 g/cm³;
 (ii) placing the composition into the well.

18. The method of claim 17, wherein the flexible particles comprise fluoroelastomers, perfluoroelastomers, copolymers of tetrafluoroethylene and propylene, fluorosilicones, or polytetrafluoroethylenes, or combinations thereof.

19. The method of claim 17, further comprising flexible particles comprising ethylene-vinyl acetate rubbers, silicones, hydrogenated nitrile rubbers, polyacrylics, chloroprenes, styrene-butadienes, styrene-butadiene-styrenes, styrene divinylbenzenes, styrene-ethylene-butylene-styrenes, ethylene acrylics or nitrile rubbers or combinations thereof, wherein the flexible particles are present in a mixture that has an average density higher than 1.5 g/cm$^3$.

20. The method of claim 17, wherein the flexible particles have a particle size between 10 μm and 1000 μm.

* * * * *